United States Patent
Lin et al.

(10) Patent No.: US 7,330,504 B2
(45) Date of Patent: Feb. 12, 2008

(54) METHOD AND APPARATUS FOR LOW POWER-RISE POWER CONTROL USING SLIDING-WINDOW-WEIGHTED QOS MEASUREMENTS

(75) Inventors: Wei Lin, San Diego, CA (US); Yuan Kang Lee, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 611 days.

(21) Appl. No.: 10/303,986

(22) Filed: Nov. 25, 2002

(65) Prior Publication Data

US 2004/0202243 A1   Oct. 14, 2004

(51) Int. Cl.
*H04B 3/46* (2006.01)
*H04B 17/00* (2006.01)
*H04B 1/00* (2006.01)
*H04B 7/00* (2006.01)

(52) U.S. Cl. .................. 375/227; 375/130; 375/135; 375/147; 455/70

(58) Field of Classification Search .......... 370/230–31, 370/233–37, 522, 231, 234, 235, 236, 335; 375/200, 206, 227, 224, 130, 140, 141, 146, 375/147, 135, 335, 358; 371/41, 43, 37.1; 455/67.1, 67.3, 63, 69, 88, 522, 506, 226, 455/70

See application file for complete search history.

(56) References Cited

U.S. PATENT DOCUMENTS

| | | | |
|---|---|---|---|
| 4,785,411 A | * | 11/1988 | Thompson et al. ......... 708/322 |
| 5,267,262 A | | 11/1993 | Wheatley, III |
| 5,564,074 A | | 10/1996 | Juntti |
| 5,590,409 A | | 12/1996 | Sawahashi et al. |
| 5,604,766 A | | 2/1997 | Dohi et al. |
| 5,631,921 A | | 5/1997 | Schilling |
| 5,722,051 A | | 2/1998 | Agrawal et al. |
| 5,745,520 A | | 4/1998 | Love et al. |
| 5,790,533 A | | 8/1998 | Burke et al. |
| 5,839,056 A | | 11/1998 | Hakkinen |
| 5,960,361 A | | 9/1999 | Chen |
| 5,991,636 A | | 11/1999 | Won et al. |
| 6,032,026 A | | 2/2000 | Seki et al. |
| 6,154,450 A | * | 11/2000 | Wallentin et al. ........... 370/311 |
| 6,212,399 B1 | | 4/2001 | Kumar et al. |

(Continued)

FOREIGN PATENT DOCUMENTS

WO   WO 98/45962   10/1999

*Primary Examiner*—Mohammed Ghayour
*Assistant Examiner*—Sophia Vlahos
(74) *Attorney, Agent, or Firm*—Ronald O. Neerings; Wade James Brady, III; Frederick J. Telecky, Jr.

(57) ABSTRACT

A system and method for adjusting the power control target for a spread-spectrum communication system 110 is disclosed. A preferred embodiment comprises correcting a power control target 128 based upon the difference between a filtered series of actual error signals 124 and the expected number of errors 126 over a properly determined time window. By using a filtered series of actual error signals, the power control target update step-size is adaptive to the channel conditions, and the power-rise is reduced, thereby reducing power requirements and signal dropouts. The invention finds application, for example, in personal communication devices such as cellular telephones and may be implemented using a digital signal processor (DSP).

16 Claims, 4 Drawing Sheets

U.S. PATENT DOCUMENTS

| | | |
|---|---|---|
| 6,259,927 B1 | 7/2001 | Butovitsch et al. |
| 6,259,928 B1 | 7/2001 | Vembu |
| 6,285,887 B1 | 9/2001 | Mimura |
| 6,292,519 B1 | 9/2001 | Popovic |
| 6,337,988 B1 | 1/2002 | Agin et al. |
| 6,347,083 B1 | 2/2002 | Nishino |
| 6,347,231 B1 | 2/2002 | Miya |
| 6,385,183 B1 | 5/2002 | Takeo |
| 6,445,930 B1 | 9/2002 | Bartleme et al. |
| 6,628,924 B1 * | 9/2003 | Miyamoto ............... 455/69 |
| 6,639,934 B1 * | 10/2003 | Engstrom et al. ........... 375/130 |
| 6,965,780 B1 * | 11/2005 | Monogioudis et al. ...... 455/522 |
| 6,967,987 B2 * | 11/2005 | Higuchi et al. .............. 375/130 |
| 7,050,760 B2 * | 5/2006 | Itoh ........................ 455/67.13 |
| 7,082,317 B2 * | 7/2006 | Yano et al. ................. 455/522 |
| 2002/0034215 A1 | 3/2002 | Yanagi |
| 2002/0051482 A1 | 5/2002 | Lomp |
| 2003/0148769 A1 * | 8/2003 | Chi et al. ................... 455/453 |

* cited by examiner

Prior Art

METHOD AND APPARATUS FOR LOW POWER-RISE POWER CONTROL USING SLIDING-WINDOW-WEIGHTED QOS MEASUREMENTS

CROSS-REFERENCE TO RELATED APPLICATIONS

This application is related to the following co-pending and commonly assigned patent applications: Ser. No. 10/303,463, filed concurrently herewith and entitled "Method and Apparatus for Fast Convergent Power Control in a Spread Spectrum Communication System" and Ser. No.10/303,189, filed concurrently herewith and entitled "Method and Apparatus for Setting the Threshold of a Power Control Target in a Spread Spectrum Communication System". Both of these applications are hereby incorporated herein by reference.

TECHNICAL FIELD

The present invention relates generally to an apparatus and method for power control in a communication system, and more particularly to an apparatus and method for adjusting the power control target and minimizing power-rise using a sliding-window-filtering algorithm in a spread-spectrum communication system.

BACKGROUND

Power control is commonly used in communication systems for minimizing transmission power while maintaining the received signal quality at the desired level. In a code division multiple access (CDMA) spread spectrum communication system, since one user's signal contributes to other users' noise, power control is essential to mitigate the near-far problem and improve the system capacity. Furthermore, in order to minimize power consumption while ensuring a specified minimum quality of service (QoS) under varying channel conditions, the power control target, which is typically a threshold for the received signal to interference ratio (SIR), is updated autonomously to adapt to the change of communication environments. The QoS is typically specified in terms of a block error rate (BLER) or a bit error rate (BER). Examples of such communication systems include those operating under the IS-95, IS-2000, UMTS/WCDMA and TD-SCDMA standards.

For example, in a UMTS/WCDMA system (the UMTS/WCDMA standard can be found at http://www.3gpp.org), an open loop power control scheme is used for determining an initial transmission power at the start of a transmission. A closed loop power control scheme is used to adjust the ongoing transmission power to warrant the specified minimum QoS. The closed loop power control scheme includes both an inner loop power control system and an outer loop power control system. The inner loop power control system in a receiver estimates the received SIR and compares it to the power control target $SIR_{target}$. If the estimated SIR is greater than the target $SIR_{target}$, the receiver generates a power down command that is sent to the transmitter. Conversely, if the estimated SIR is lower than $SIR_{target}$, the receiver generates a power up command that is sent to the transmitter. The transmitter then adjusts the transmission power based on the decoded received power control commands. This inner loop power control system operates at a 1,500 Hz update rate. The outer loop power control system uses an algorithm to control $SIR_{target}$ by adjusting it such that the specified minimum QoS is achieved at minimum power all the time.

A significant concern in the $SIR_{target}$ update algorithm is the resulting power-rise. Power rise is defined as the difference between the actual average transmitted power and the minimum transmitted power required to meet the specified minimum QoS. The smaller (and non-negative) the power-rise, the better the $SIR_{target}$ update algorithm for several reasons. A larger power-rise results in reduced system capacity due to the nature of a spread spectrum communication system. This excess transmitted power reduces the battery life for a mobile terminal such as a cellular telephone. The excess transmitted power also produces un-necessary interference to other mobile receivers.

If the transmitted power is lower than that required to warrant the specified minimum QoS, communication will suffer high error rate or even dropouts may occur.

A prior art $SIR_{target}$ update algorithm 100 is illustrated in FIG. 1a. In this prior art, a receiver receives a series of data blocks, one block at each time. Each block can be determined as a good block or a bad block based on, for example, the result of a CRC check. Upon decoding the current data block, the block is checked for errors 102. If an error occurs, the $SIR_{target}$ update algorithm steps up $SIR_{target}$ by an integer multiple K of a fixed increment A as shown by 104. If no error occurs, the $SIR_{target}$ update algorithm would step down $SIR_{target}$ by the fixed increment A as shown by 106. By using fixed increments, significant overshoot and undershoot occurred. It should also be noted that this prior art $SIR_{target}$ update algorithm bases its $SIR_{target}$ update on just the current data block. This memory-less operation will produce large power-rise under steady channel conditions when the $SIR_{target}$ is expected to be as constant as possible.

An alternative $SIR_{target}$ update algorithm is based upon the proportional-integral-derivative (PID) controller as shown in FIG. 1b. This approach filters the difference between the specified minimum QoS (labeled as "Desired QoS") and the actual QoS and then updates $SIR_{target}$ based upon this difference. It should be noted that in this prior art the actual QoS is computed from all the previously received data blocks. Under varying channel conditions, the $SIR_{target}$ is expected to track and compensate the change of channel as quickly as possible. This full-memory operation, however, responded slowly to the change of channel, and results in significant overshoot and undershoot, and therefore high power-rise.

Thus there exists a strong need to reduce the power-rise in a power-controlled communication system by using variable step-size based on proper length of history in the $SIR_{target}$ update algorithm.

SUMMARY OF THE INVENTION

These and other problems are generally solved or circumvented, and technical advantages are generally achieved, by preferred embodiments of the present invention that reduce the target SIR $SIR_{target}$ overshoot and undershoot. By avoiding $SIR_{target}$ overshoot or undershoot, embodiments of the present invention reduce power consumption by a PCD and interference with other PCDs.

In accordance with a first embodiment of the present invention, a method for controlling $SIR_{target}$ comprises receiving a series of actual error signals, filtering the series of actual error signals, computing an expected error signal, comparing the filtered series of actual error signals and the expected error signal and generating a correction signal ($SIR_{cor.}$) based upon this comparison, and updating $SIR_{target}$ based upon $SIR_{cor.}$.

In accordance with a second embodiment of the present invention, an apparatus for controlling $SIR_{target}$ comprises a receiver for receiving a series of actual error signals, a filter for filtering the series of actual error signals, a processor for computing an expected error signal, a comparator for comparing the filtered series of actual error signals and the expected error signal, the comparator thus generating $SIR_{cor.}$ and a corrector for adjusting $SIR_{target}$ based upon $SIR_{cor.}$.

In accordance with a third embodiment of the present invention, a digital signal processor (DSP) for inclusion in a communication device comprises digital signal processing code for receiving a series of actual error signals, filtering the series of actual error signals, computing an expected error signal, comparing the filtered series of actual error signals and the expected error signal thereby generating $SIR_{cor.}$ and adjusting $SIR_{target}$ based upon $SIR_{cor.}$.

An advantage of the preferred embodiment of the present invention is that it reduces power-rise that consumes transmission power in a PCD. By minimizing transmission power, a battery's operating time in a PCD can be extended.

A further advantage of the preferred embodiment of the present invention is that by minimizing power-rise, more PCDs can operate from a single base station while maintaining a specified minimum QoS, respectively. This increase in the number of PCDs for each base station reduces the number of required base stations, thereby reducing overall communication system costs.

Yet another advantage of embodiments of the present invention is that by reducing power-rise, self-generated interference is reduced. By reducing self-interference, a specified minimum QoS can be maintained at lower transmission power levels.

Another advantage of embodiments of the present invention is that signal dropouts are reduced by reducing $SIR_{target}$ undershoot. By reducing the number of signal dropouts, a specified minimum QoS can more readily be maintained.

The foregoing has outlined rather broadly the features and technical advantages of the present invention in order that the detailed description that follows may be better understood. Additional features and advantages of the invention will be described hereinafter, which form the subject of the claims of the invention. It should be appreciated by those skilled in the art that the conception and specific embodiments disclosed might be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

The process and a system for implementing this process of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a personal communication device (PCD). The invention may also be applied, however, to other communication systems.

Figure 2:
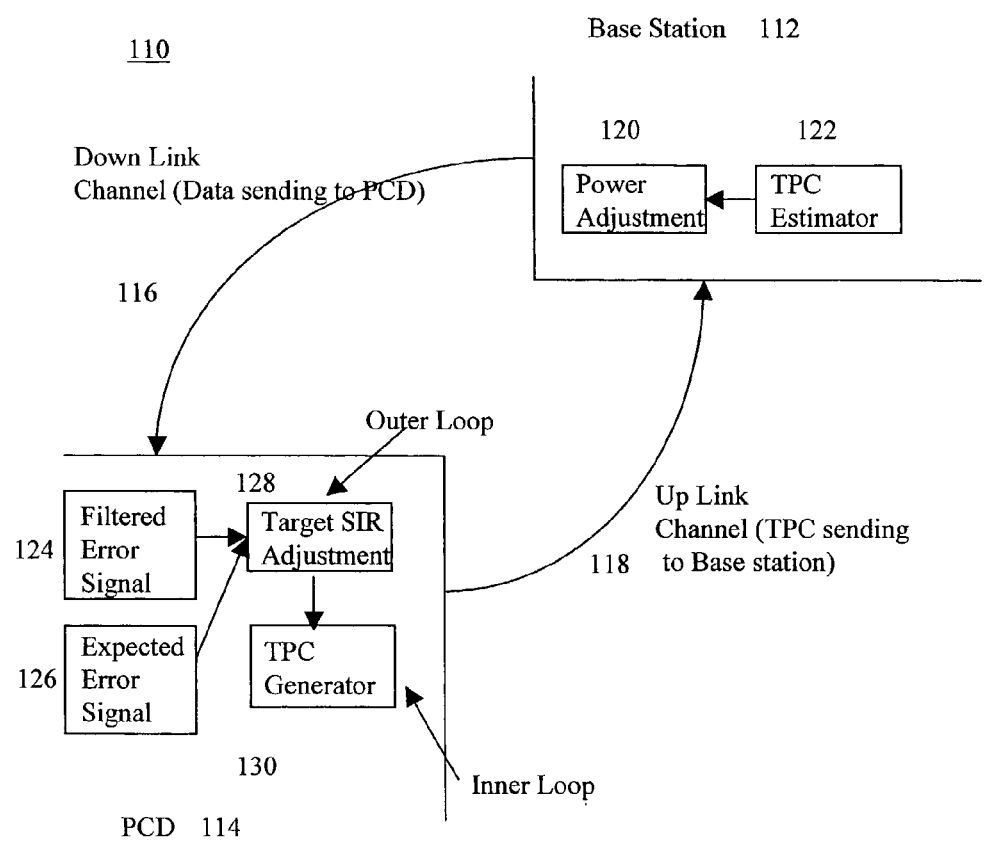
FIG. 2 is an overview of a telecommunications system that can incorporate an embodiment of the present invention.

FIG. 2 shows an overview of a communication system 110. The system includes both a base station 112 and a PCD 114. The base station 112 and the PCD 114 transmit and receive data via a down link channel 116 and an up link channel 118. Performance of the base station 112 is optimized in part by a power adjustment 120 received from a transmission power command (TPC) estimator 122. Performance of the PCD 114 is optimized in part by adjusting the target signal to interference ratio ($SIR_{target}$) in an outer loop power control and generating the TPC in an inner loop power control. This optimization uses filtered error signal data 124, expected error calculation data 126, target SIR adjustment data 128 and a TPC generator 130. The filtered error signal data 124 is used for target SIR adjustment 128. The expected error calculation data 126 is used in target SIR adjustment 128. Lastly, the output signal of the target SIR adjustment 128 is used in the TPC generator 130.

Figure 1A:
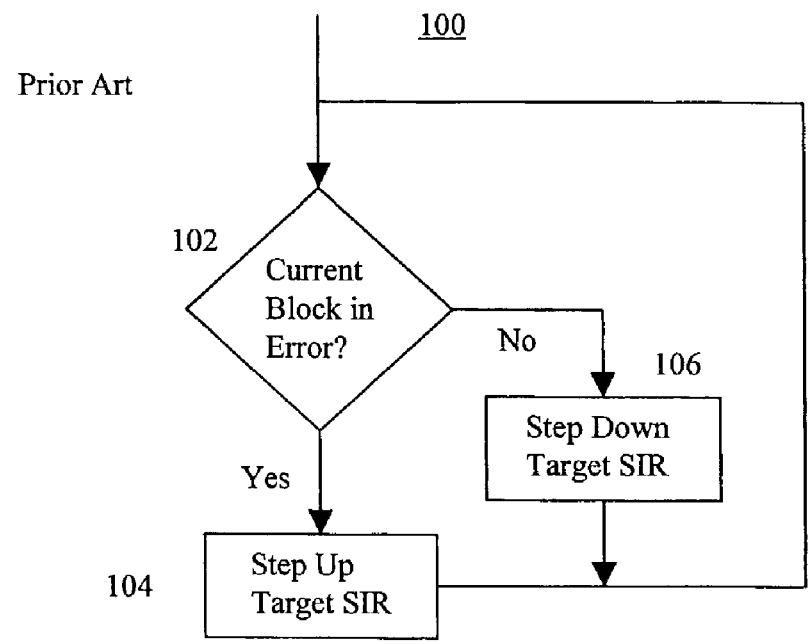
FIG. 1a is a flowchart of the prior art target SIR control system.
Figure 3:
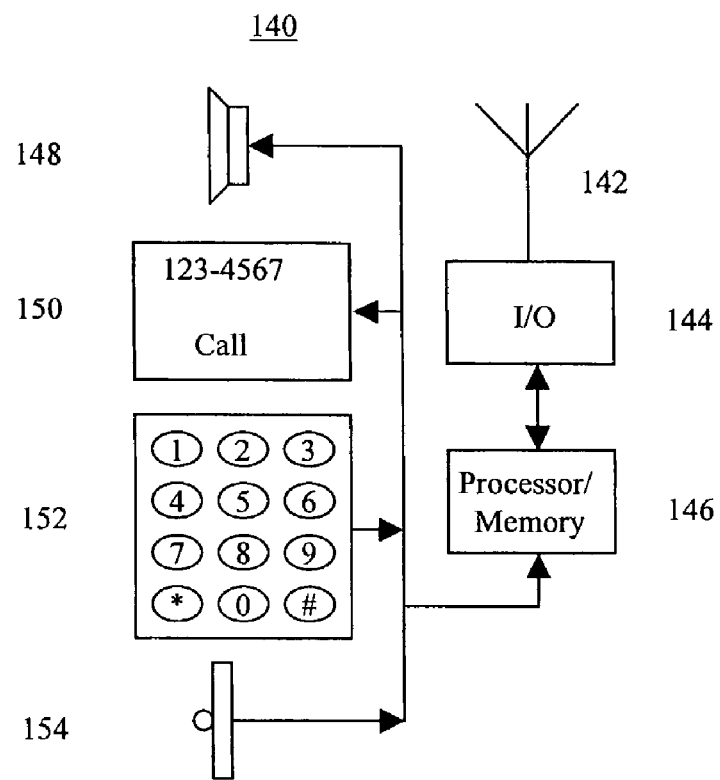
FIG. 3 is a an overview of a personal communication device that can incorporate an embodiment of the present invention
Figure 1B:
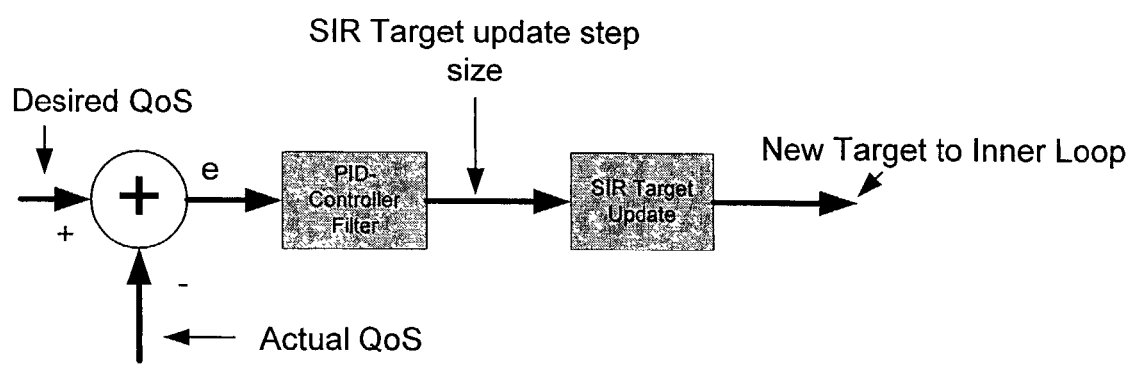
FIG. 1b is a block diagram of a portion of a prior art communication system.

An example PCD 114 in the form of a cellular telephone 140 is illustrated in FIG. 3. The cellular telephone 140 includes an antenna 142, an input/output section 144, a processor/memory unit 146, a speaker 148, a display panel 150, a keypad 152, and a microphone 154. Data frames are received by the antenna 142, modified by the input/output section 144, and provided to the processor/memory unit 146. The processor/memory unit 146 may also receive data from the keypad 152 or the microphone 154. The processor/memory unit 146 may display data on the display panel 148 or output sounds to the speaker 148. While the processor/memory unit 146 is illustrated as a single element, a separate processor and a separate memory may also be used. A digital signal processor (DSP) may also be used as the processor/memory unit 146.

As the specified minimum quality of service (QoS) is frequently a function of, or equal to, the Block Error Rate (BLER) or the Bit Error Rate (BER), the BLER will be used to represent the QoS without loss of generality throughout the remainder of this description. A BLER of 1% may be adequate for voice-only communication applications while a BLER of 10% will typically be required for data communication applications.

Figure 4A:
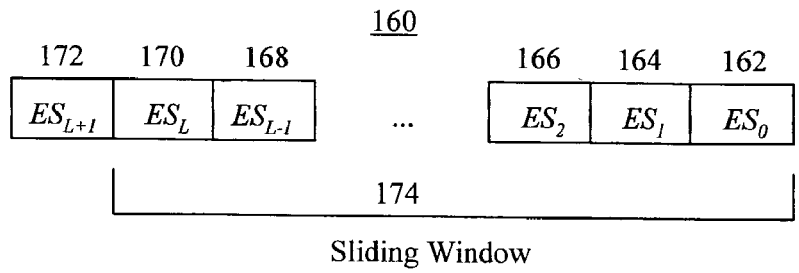
FIG. 4a illustrates the flow of error signals in an embodiment of the present invention.
Figure 4B:
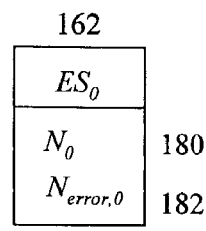
FIG. 4b illustrates the data within each error signal for use with an embodiment of the present invention.

Referring back to FIG. 2, the PCD 114 receives a series of data frames from the base station 112 via the down link channel 116. After processing the series of data frames, a series of actual error signals 160 is generated as shown in FIG. 4a. The series of actual error signals 160 includes individual actual error signals 162-172. Actual error signal $ES_0$ 162 is the error signal for the current data frame. Actual error signal $ES_1$ 164 is the error signal for the previous data frame. The present invention adjusts $SIR_{target}$ using a limited number of actual error signals. The sliding window 174 of FIG. 4a illustrates the use of L+1 actual error signals. The actual error signal $ES_0$ 162 comprises the quantity of data blocks $N_0$ 180 in the current data frame and the quantity of data blocks in error $N_{error,0}$ 182 in the current data frame as illustrated in FIG. 4b. The length of the sliding window L is an integer greater than 0 and is only limited by the amount of memory within the PCD 124. In a preferred embodiment of the present invention L is selected such that the expected number of data blocks in error within the window is between 3 and 12.

Figure 5:
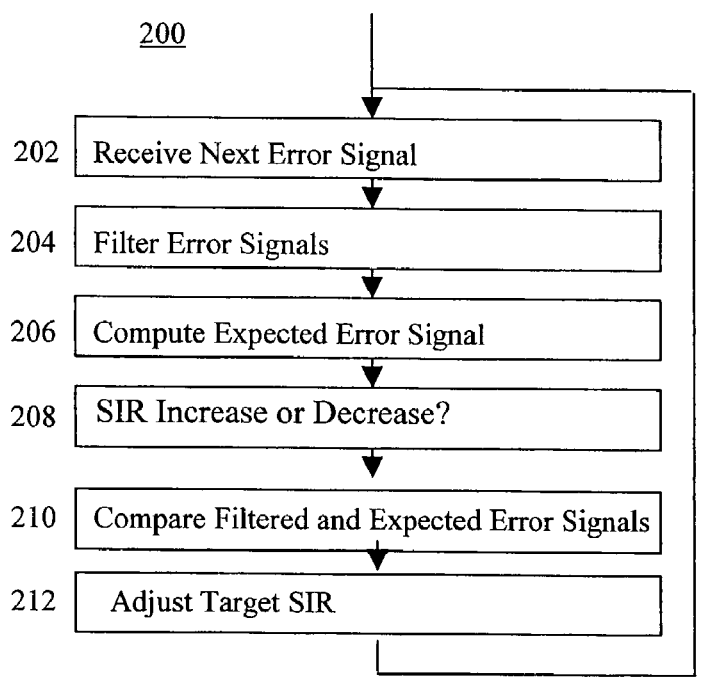
FIG. 5 is a flowchart of an embodiment of the present invention.

A loop of the process steps 200 of the present invention is shown in FIG. 5. The loop of process steps 200 comprises five primary steps that are repeated continuously during the course of data transmission and receipt. In a preferred embodiment, the loop of process steps 200 would be executed at a proper rate (e.g., 100 Hz or 50 Hz for WCDMA). First, the next actual error signal is received in step 202. The received actual error signals are then filtered in step 204 to create $N_{error,filter}$. An expected error signal ($N_{error,exp}$) is computed based upon the received error signals in step 206. The filtered actual error signals $N_{error,filter}$ and the expected error signal $N_{error,exp}$ are then compared, thereby generating the correction signal $SIR_{cor}$ in step 208. Lastly, in step 210 $SIR_{cor}$ is used to adjust $SIR_{target}$. The process is then iterated as needed. Referring to the cellular telephone example illustrated in FIG. 3, the loop of process steps 200 will generally be conducted within the input/output section 144 and the processor/memory unit 146.

The process steps will now be described in greater detail. The received actual error signals of step 202 create the series of actual error signals 160 shown in FIG. 4a. Step 204 computes $N_{error,filter}$ according to Equation 1:

$$N_{error,filter} = \sum_{i=1\ldots L} w_i * N_{error,i} + N_{error,0},\qquad \text{Eq. 1}$$

where $w_i$ is a weighting factor for the ith actual error signal and $N_{error,i}$ is the quantity of data blocks in error in the ith data frame of the sliding window 174. The weighting factors $w_i$ will typically range from 0.0 to 1.0. As an example, the most recent data frames may have weighting factors $w_i$ between 0.8 and 1.0 and the oldest data frames may have weighting factors $w_i$ between 0.0 and 0.2.

Using a voice communication system as a more specific example, the following parameters are typical. Assume that the communication system requires a BLER of 1% with 1 data block per data frame. In one example, the sliding window would have a length L+1 of 500 to provide an expected number of data blocks in error within the window of 5. The weighting factors for a simple sliding window filter could be all 1.

While a sliding window filter has been described in detail, other more general filter routines are possible. As an example, a single pole infinite impulse response (IIR) filter may be used. This IIR filter has the advantage of reducing memory costs and computation time, but is less flexible than the sliding window filter. The sliding window filter itself is but one type of finite impulse response (FIR) filter, and other FIR filters may be more suitable depending upon the application and time or memory constraints.

Step 206 first computes the total number of data blocks in the last L+1 data frames ($N_{total}$) according to Equation 2:

$$N_{total} = \sum_{i=0\ldots L} N_i,\qquad \text{Eq. 2}$$

where $N_i$ is the quantity of data blocks in the ith data frame.

Next, step 206 computes the expected number of blocks in error Nerror,exp. according to Equation 3:

$$N_{error,exp} = BLER * N_{total}.\qquad \text{Eq. 3}$$

At this point, the system will determine whether the SIR target is to increase or decrease. This step is labeled with reference numeral 208 in FIG. 5. If, in the current frame, the number of blocks in error is greater than the product of the total number of blocks and the desired block error rate (i.e., $N_{error,0} > BLER * N_0$), then SIR target will increase. Otherwise, the SIR target will decrease.

Step 210 generates the correction signal $SIR_{cor}$ in one of several ways, depending upon the application. In general, $SIR_{cor}$ is proportional to the difference between the filtered series of actual error signals $N_{error,filter}$ and the expected error signal $N_{error,exp}$ according to Equations 4A and 4B:

$$SIR_{cor.} = k_1 * (N_{error,filter} - N_{error,exp.}) * \Delta_{SIR} \text{ and}\qquad \text{Eq. 4A}$$

$$SIR_{cor.} = k_2 * (N_{error,filter} - N_{error,exp.}) * \Delta_{SIR},\qquad \text{Eq. 4B}$$

where Equation 4A applies when the SIR target needs increasing and Equation 4B applies when the SIR target needs decreasing. In these equations, $k_1$ and $k_2$ are predetermined constants and $\Delta_{SIR}$ is the minimum SIR target increment, which may be constant or variable. Typically, $k_1$ and $k_2$ are positive. In a preferred embodiment, $1 <= k_1 < 10$ and $0 < k_2 <= 1$. While not generally case, it is possible that $k_1 = k_2$.

While Equations 4A and 4B appear to base the correction signal $SIR_{cor}$ on just the difference between the actual error signals and the expected error signal, this is not the case. In this particular embodiment, the correction signal is based upon the difference between the filtered actual error signals over a properly chosen sliding window and the expected error signal over the same sliding window. This filtering of the actual error signals and determining the sliding window size provides greater flexibility and allows the present invention to reduce power-rise relative to a target SIR control algorithm based on the PD method.

In the preferred embodiment, the correction signal $SIR_{cor}$ is found according to Equations 5A and 5B:

$$SIR_{cor.} = k_1 * \max [0, (N_{error,filter} - N_{error,exp.})] * \Delta_{SIR}\qquad \text{Eq. 5A}$$

$$SIR_{cor} = k_2 * \min [0, (N_{error,filter} - N_{error,exp.})] * \Delta_{SIR}\qquad \text{Eq. 5B}$$

where Equation 5A applies when the SIR target will increase, and equation 5B applies when the SIR target will decrease as determined in 208.

Lastly, in step 212 the correction signal $SIR_{cor}$ is used to adjust the target $SIR_{target}$. The process is then iterated as needed. The new target SIR $SIR_{target,new}$ is the current $SIR_{target}$ updated according to Equation 6:

$$SIR_{target,new} = SIR_{target} + SIR_{cor.}\qquad \text{Eq. 6}$$

Although the present invention and its advantages have been described in detail, it should be understood that various changes, substitutions and alterations can be made herein without departing from the spirit and scope of the invention as defined by the appended claims. As one of ordinary skill in the art will readily appreciate from the disclosure of the present invention, processes, machines, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, means, methods, or steps.

What is claimed is:

1. A process for controlling a target signal to interference ratio (SIR) in a communication system, the process comprising:
    receiving a series of actual error signals, wherein each actual error signal includes a quantity of data blocks and a quantity of data blocks in error;
    determining a size of a sliding window;
    filtering the series of actual error signals within the sliding window;
    computing an expected error signal within the sliding window;
    determining whether the target SIR will increase or decrease; and
    generating a correction signal by comparing the filtered series of actual error signals and the expected error signal, wherein the correction signal is set to zero when it is determined that the target SIR will increase and the expected error signal is greater than the filtered actual error signal and the correction signal is set to zero when it is determined that the target SIR will decrease and the expected error signal is less than the filtered actual error signal.

2. A communication apparatus comprising:
    a receiver coupled to receive a transmission, a series of actual error signals being determined from the transmission wherein each actual error signal includes a quantity of data blocks and a quantity of data blocks in error;
    a sliding window filter to filter the actual error signals from the receiver, the sliding window filter having a variable size of sliding window;
    an expected error generator to determine an expected error signal;
    a comparator coupled to receive the expected error signal and the actual error signal, the comparator generating a correction signal based upon the expected error signal and the actual error signal; and
    a transmitter coupled to receive the correction signal from the comparator and transmit an update message based upon the correction signal.

3. The apparatus of claim 2 wherein the communication apparatus comprises a cellular telephone.

4. The apparatus of claim 2, further comprising a digital signal processor including the filter, the error generator and the comparator.

5. A communication apparatus comprising:
    means for receiving a series of actual error signals, wherein each actual error signal includes a quantity of data block blocks and a quantity of data blocks in error;
    means for determining a size of a sliding window;
    means for filtering the series of actual error signals using the sliding window;
    means for computing an expected error signal using the sliding window;
    means for determining whether a target signal to interference ratio (SIR) will increase or decrease;
    means for generating a correction signal by comparing the filtered series of actual error signals and the expected error signal, the means for generating further comprising
        means for generating a difference signal from the expected error signal and the filtered series of actual error signals, and
        means for multiplying the difference signal by a first predetermined constant when the target SIR is to be increased, and for multiplying the difference signal by a second predetermined constant when the target SIR is to be decreased; and
    means for updating the target SIR based upon the correction signal.

6. The apparatus of claim 5, wherein the means for filtering comprises:
    means for weighting each quantity of data blocks in error in the series of actual error signals; and
    means for summing together each of the weighted quantity of data blocks in error.

7. The apparatus of claim 5, wherein the means for computing comprises:
    means for summing the quantity of data blocks in the series of actual error signals; and
    means for multiplying the summed quantity of data blocks by an acceptable error rate.

8. The apparatus of claim 5, wherein the means for updating comprises means for summing the target SIR and the correction signal.

9. A personal communication device comprising:
    an antenna;
    a signal input/output section;
    a display;
    a keypad; and
    a data processor, wherein the data processor is adapted to:
    receive a series of actual error signals, wherein each actual error signal includes a quantity of data block blocks and a quantity of data blocks in error;
    determine a size of a sliding window;
    filter the series of actual error signals using the sliding window;
    compute an expected error signal using the sliding window;
    determine whether a target signal to interference ratio (SIR) will increase or decrease;
    generate a correction signal by comparing the filtered series of actual error signals and the expected error signal, the comparing comprising
        subtracting the expected error signal from the filtered series of actual error signals thereby generating a difference signal, and
        multiplying the difference signal by a first predetermined constant when the target SIR is to be increased, and by a second predetermined constant when the target SIR is to be decreased; and
    update the target SIR based upon the correction signal.

10. The device of claim 9 wherein the personal communication device is a cellular telephone.

11. The device of claim 10 wherein the cellular telephone communicates via CDMA.

12. A process for controlling a target signal to interference ratio (SIR) in a communication system, the process comprising:

receiving a series of actual error signals, wherein each actual error signal includes data blocks and data blocks in error;

determining a window size;

weighting a quantity of data error data, the quantity determined from the window size;

summing together each of the weighted quantity of data error data thereby generating a filtered series of actual error signals;

totaling the quantity of data block data in the series of actual error signals;

generating an expected error signal by multiplying the totaled quantity of data block data by an acceptable error rate;

generating a difference signal by subtracting the expected error signal from the filtered series of actual error signals;

determining whether the target SIR will increase or decrease;

generating a correction signal comprising multiplying the difference signal by a first predetermined constant when the target SIR is to be increased, and by a second predetermined constant when the target SIR is to be decreased, thereby generating a multiplication result; and updating the target signal to interference ratio based upon the correction signal.

13. The method of claim 12 wherein updating the target SIR comprises summing a previous target signal to interference ratio and the correction signal.

14. The method of claim 12 wherein the correction signal is set to zero when it is determined that the target SIR will increase and the expected error signal is greater than the filtered actual error signal and the correction signal is set to zero when it is determined that the target SIR will increase and the expected error signal is less than the filtered actual error signal.

15. The process of claim 12, wherein the generating the correction signal further comprises multiplying the multiplication result by a minimum target SIR increment.

16. A process for controlling a target signal to interference ratio (SIR) in a communication system, the process comprising:

receiving a series of actual error signals, wherein each actual error signal includes a quantity of data blocks and a quantity of data blocks in error;

determining a size of a sliding window;

filtering the series of actual error signals within the sliding window;

computing an expected error signal within the sliding window;

determining whether the target SIR will increase or decrease; and generating a correction signal by comparing the filtered series of actual error signals and the expected error signal, wherein the generating the correction signal further comprises multiplying a multiplication result by a minimum target SIR increment.

* * * * *